United States Patent [19]

Kusmer

[11] Patent Number: 5,090,658
[45] Date of Patent: Feb. 25, 1992

[54] BELLOWS SEALED ROTARY VALVE AND SEAL ASSEMBLY

[75] Inventor: Dan P. Kusmer, Stafford, Tex.

[73] Assignee: Keystone International, Inc., Houston, Tex.

[21] Appl. No.: 648,542

[22] Filed: Jan. 30, 1991

[51] Int. Cl.⁵ .............. F16K 31/05; F16K 31/14; F16K 41/10
[52] U.S. Cl. .......................... 251/14; 74/625; 251/129.11; 251/214; 251/229; 251/249.5; 251/335.3; 277/200; 475/4; 475/176
[58] Field of Search .............. 74/625; 251/14, 58, 251/229, 248, 129.11, 214, 335.3, 249.5; 475/4, 162, 176, 177; 277/200

[56] References Cited

U.S. PATENT DOCUMENTS

| | | | |
|---|---|---|---|
| 1,192,627 | 7/1916 | Hatlee | 475/176 |
| 1,301,948 | 4/1919 | Kaplan et al. | 251/229 |
| 1,644,825 | 10/1927 | Fulton | 251/229 |
| 1,731,009 | 10/1929 | King | 74/18.1 |
| 2,317,422 | 4/1943 | Thomsen | 251/335.3 |
| 2,659,569 | 11/1953 | Ehlke | 251/335.3 |
| 2,659,570 | 11/1953 | Werker et al. | 251/335.3 |
| 3,052,138 | 9/1962 | Louton, Jr. et al. | 475/176 |
| 3,056,315 | 10/1962 | Mros | 475/176 |
| 3,082,632 | 3/1963 | Vulliez | 74/18.1 |
| 3,289,484 | 12/1966 | Archer et al. | 74/18.1 |
| 3,295,191 | 1/1967 | Gallagher et al. | 29/890.129 |
| 3,491,789 | 1/1970 | Callahan, Jr. et al. | 137/340 |
| 3,524,620 | 8/1970 | Gallagher et al. | 251/63.4 |
| 3,782,685 | 1/1974 | Gallagher et al. | 251/306 |
| 3,787,023 | 1/1974 | Shufflebarger et al. | 251/335.3 |
| 3,811,651 | 5/1974 | Gallagher et al. | 251/335.3 |
| 4,166,607 | 9/1979 | Webb | 251/335.3 |
| 4,232,695 | 11/1980 | Roberge | 137/1 |
| 4,452,426 | 6/1984 | Owoc | 251/335.3 |
| 4,462,422 | 7/1984 | Owoc et al. | 137/557 |
| 4,468,002 | 8/1984 | Tremblay | 251/335.3 |
| 4,516,754 | 5/1985 | Owoc | 251/335.3 |
| 4,540,019 | 9/1985 | Owoc et al. | 137/557 |
| 4,546,662 | 10/1985 | Tremblay | 74/18.1 |
| 4,597,556 | 7/1986 | Sandling | 251/335.3 |
| 4,762,025 | 8/1988 | Lew | 475/177 |
| 4,892,010 | 1/1990 | Pottier et al. | 74/18.1 |
| 4,976,403 | 12/1990 | Bramblet | 251/214 |

FOREIGN PATENT DOCUMENTS

| | | | |
|---|---|---|---|
| 350865 | 6/1979 | Austria | 251/335.3 |
| 3723835 | 1/1989 | Fed. Rep. of Germany | 251/335.3 |
| 785149 | 9/1955 | United Kingdom | 251/335.3 |
| 826513 | 1/1960 | United Kingdom | |

OTHER PUBLICATIONS

Advertisement "Typical Applications of Bellows", undated, one page.
Advertisement "Keystone Figure 777", undated, single, two-sided.

Primary Examiner—George L. Walton
Attorney, Agent, or Firm—Browning, Bushman, Anderson & Brookhart

[57] ABSTRACT

An improved rotary valve is provided with a bellows surrounding a bent shaft to create a hermetic seal and thereby prevent fluid loss from the interior of the valve body. The shaft is provided within a seal assembly housing, and has a lower end axis offset from the valve stem axis, and an upper end axis offset from the lower end axis. The bellows is fixedly secured at its upper end to the seal assembly housing and at its lower end to an end cap to prevent fluid within the cavity from passing out the seal assembly housing. An epicyclic gearing assembly is provided within the cavity and mechanically interconnects the lower end of the shaft to the valve stem. An actuator may be provided for connection with the upper end of the shaft for rotating the shaft. The activating device of the present invention may be used for rotating various members mounted within an enclosure with sealing the enclosure from the environment. The apparatus of the present invention has significant advantage in that it combines a hermetically sealed valve with a valve that requires low torque output for the valve operator.

20 Claims, 3 Drawing Sheets

BELLOWS SEALED ROTARY VALVE AND SEAL ASSEMBLY

BACKGROUND OF THE INVENTION

1. Field of the Invention

The present invention relates to a rotary valve and, more particularly, to a rotary valve with a hermetic rotary seal assembly for preventing process fluid which passes through the valve from escaping to the environment. The invention also relates to a hermetic seal assembly for sealingly controlling rotary motion of a member mounted within a valve body or other enclosure.

2. Description of the Background

The valve industry has long recognized that dynamic seals, i.e., seals between sliding and/or rotating components, do not provide the high reliability achieved by static seals. Ball valves, plug valves, butterfly valves, and other rotary valves conventionally each employ a rotary stem extending through the valve body and connected to a valve member within the body to control fluid flow through the valve. Traditionally, a dynamic seal, such as a packing, was provided for sealing between the valve body and the rotary stem. This dynamic seal does not satisfy increasingly stringent government regulations designed to eliminate leaks of process fluids from the valves, and accordingly increased efforts are being expended to provide a valve which does not utilize dynamic seals to eliminate leakage from the valve.

A bellows has long been employed as a viable alternative to avoid dynamic seals. Various valve manufacturers have thus promoted valves which replaced the dynamic stem seal with a bellows to hermetically seal a chamber and thus prevent the escape of process fluids from the valve. Early disclosures of a bellows within a valve enclosing a valve stem or shaft are contained in U.S. Pat. Nos. 785,149; 1,301,948; 1,644,825; 2,659,569; and 3,787,023. Bellows have been used in valves either to seal a shaft with an upper end of a housing (externally pressurized bellows), or to seal a shaft with the valve body (internally pressurized bellows).

In recent years, bellows surrounding a valve stem have been most commonly used in rotary valves to retain pressurized fluid within the valve body and the interior of the bellows. Since the flow path through the valve and the interior of the bellows are in fluid communication, the internally pressurized bellows design avoids problems associated with sealing the chamber external of the bellows from the environment. In order to obtain the necessary rotation of the valve member without rotating the bellows, the upper end of the stem within the bellows is bent or offset with respect to the lower end, so that the upper end may be rotated in an orbital path to rotate the lower end of the stem and thus the valve member. Valves of the type described above are more fully disclosed in U.S. Pat. Nos. 3,782,685; 3,811,651; 4,452,426; and 4,516,574.

One of the problems encountered with a rotary actuator having an internally pressurized bellows surrounding its bent valve stem is referred to as "squirm" of the bellows. A bent, internally pressurized bellows is unstable and thus tends to buckle, especially when the valve and thus the bellows are subjected to high pressure. A second problem concerns a trade-off between the desired high sealing reliability for a bellows, and the expense and size of a large valve actuator. The cycle life of a bellows is directly related to the radius of curvature for the bellows, i.e., its cycle life decreases as its radius of curvature decreases. The length of the bellows is preferably short to minimize manufacturing costs and reduce the overall size of the valve. In some valve designs, the bellows bends a full 90° over a relatively short distance, which adversely affects the life of the bellows and thus the long-term reliability of the valve. Most valves with 90° bent bellows are small, hand-operated valves generally subject to infrequent operation and/or relatively low process line pressure.

Other valves have been designed with bellows which are subject to only a slight bend, so that the moment arm (the radial distance from the bend in the shaft to the valve stem axis) acting on the valve member is relatively short. In this case, a large and more powerful operator typically is used to rotate the upper end of the stem through its 90° turn and thus open or close the valve. Practical size and cost limitations on the operators limit the torque rating of these valves, and valve with bellows having a slight bend and controlled by powered operators are typically installed on process lines having a diameter of 6 inches or less.

Various techniques have been employed, such as those discussed in U.S. Pat. Nos. 4,462,422; 4,468,002; 4,540,019; and 4,546,662, to minimize the squirm of the bellows and increase the bellows life. While these techniques may reduce bellows squirm in a rotary valve, they do not overcome this problem. Moreover, the prior art does not satisfy the need for a large and expensive operator to open or close a sizable valve if the valve is of the type utilizing a bellows to hermetically seal the interior of the valve from the environment.

The disadvantages of the prior art are overcome by the present invention, and an improved bellows sealed rotary valve and a seal assembly for use with such a valve are hereinafter disclosed.

SUMMARY OF THE INVENTION

The invention is directed to a technique both for hermetically sealing a valve from the environment and thereby substantially reducing the likelihood of leakage from the valve during repeated use, and for enabling a low cost and reduced size valve operator to rotate the valve member within the valve body and thereby allow a relatively small operator to be used even when the valve is subject to high pressure and requires a high opening and closing torque. The present invention combines concepts in a unique manner to obtain both objectives without significantly increasing the cost of the valve. In another sense, the invention is directed to an actuating device for rotating any member rotatably mounted within an enclosure while reliably sealing the interior of the enclosure from the environment.

In a suitable embodiment, the invention comprises a rotary valve including a conventional valve body with a flow through passageway, a valve member rotatable within the passageway to open and close the valve, and a valve stem extending through the body to rotate the valve member. The rotary valve may be a ball valve, plug valve, or other type of rotary valve, and a butterfly valve is more fully described herein. A seal assembly housing is sealingly secured at its lower end to the valve body by a conventional static seal, and a rotary actuator is mounted to the upper end of the seal assembly housing. A bent shaft is provided within the interior cavity of the seal assembly housing, and has its lower end axis offset from its upper end axis. A bellows surrounds the bent shaft and is sealed at its upper end to the seal assembly housing, and at its lower end to a cap rotatable with respect to the shaft. Fluid pressure within the cavity of the seal assembly housing is sealed from the exterior of the assembly by the bellows.

An eccentric carrier is provided for interconnecting the end cap with an epicyclic gearing assembly. The valve actuator rotates the upper end of the shaft, which may be aligned with the valve stem axis, and thus moves the offset lower end of the shaft through an orbital path, thereby causing rotation of a rotary gear of the epicyclic gearing assembly and rotating the valve stem to open or close the valve. The output of the shaft is orbital and is mated to the input of the epicyclic gearing assembly which conveniently utilizes an orbital input and provides a rotatable output for turning the valve stem. The gearing assembly preferably provides a significant gear reduction between the actuator rotation and the valve stem rotation, which allows the valve member to be accurately positioned within the valve body for effective throttle control. This epicyclic gear reduction also allows the valve to effectively be self-locking, so that an additional mechanism is not required to overcome backdrive of the valve. Because of the significant advantage provided by the epicyclic gearing assembly, a large angle bend in the shaft is not required, thereby enhancing the sealing reliability of the bellows over the life of the valve. The design is compact, and provides a significant cost reduction be reducing the required size of the actuator for a hermetically sealed valve.

It is an object of the present invention to provide a hermetically sealed valve which does not require a large valve operator or a sizable offset in a bent shaft enclosed by a bellows to obtain a high torque output for operating the valve.

It is another object of this invention to provide an improved rotary valve with a seal assembly housing containing a bent shaft having its upper end axis aligned for interconnection with an actuator, and its lower end axis offset from the upper end axis. The lower end of the shaft is interconnected with a gearing assembly for rotating the valve stem to control operation of the valve, and a bellows surrounds the bent shaft and is sealed at its upper end to the seal assembly housing to prevent leakage from the valve.

It is a feature of this invention that an epicyclic gearing assembly is utilized in conjunction with a hermetically sealed valve such that the valve has effective throttle control without being susceptible to backdrive.

Yet another feature of the invention is that a high torque hermetically sealed valve may be hand operated due to the mechanical advantage provided by the epicyclic gearing assembly.

It is a further feature of the invention that the input to the seal assembly housing is rotatable, thereby facilitating the use of a conventional rotary actuator.

It is an advantage of the invention that the overall valve, including the seal assembly housing and the actuator, have a compact design and a relatively low cost.

It is a further advantage of the invention that the actuator input to the seal assembly housing, the seal assembly output, and the valve stem are all substantially aligned, while the lower end of the bent shaft is offset from the seal assembly output axis.

It is yet another advantage of the invention that the bellows is subject to external rather than internal pressure, thereby minimizing problems associated with squirm of the bellows.

These and further objects, features, and advantages of the present invention will become apparent from the following detailed description, wherein reference is made to the figures in the accompanying drawings.

BRIEF DESCRIPTION OF PREFERRED EMBODIMENTS

Figure 1:
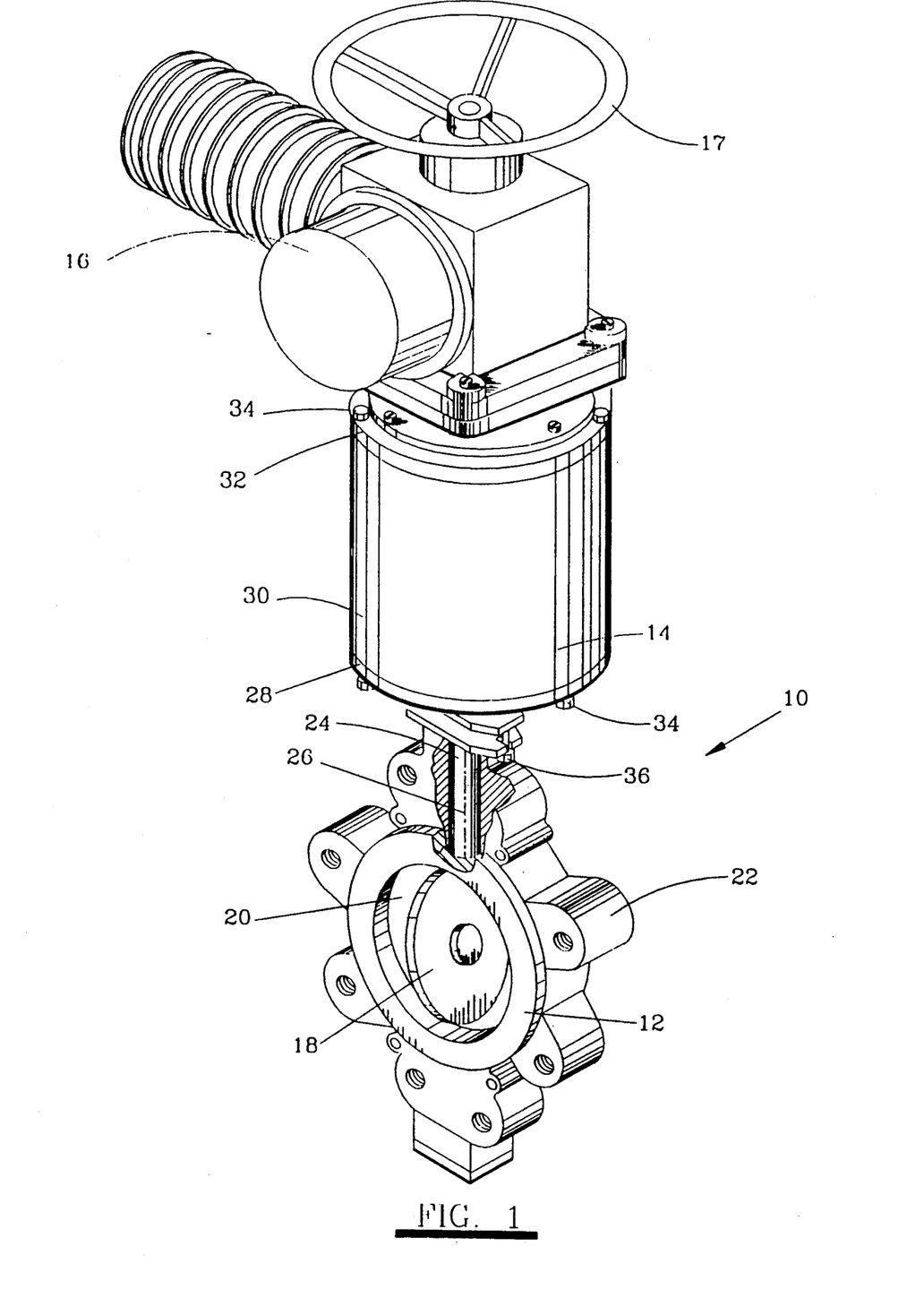
FIG. 1 is a simplified pictorial view of a rotary valve according to the present invention, including a valve body, a seal assembly housing mounted to the valve body, a rotary actuator mounted to the seal assembly housing.

FIG. 1 depicts a valve assembly 10 including a conventional valve body 12, a seal assembly housing 14 mounted to the valve body, and a conventional rotary actuator 16 mounted to the seal assembly housing. Valve assembly 10 is depicted with a butterfly valve member or disc 18 rotatably mounted within the flow passageway 20 through the valve body to control the flow of fluid through the valve. A valve stem 24 is interconnected with valve member 18 and rotates about axis 26. The body includes a plurality of projecting ears 22 for interconnecting the valve body to a suitable flow line by appropriate flanges (not shown). Although a butterfly valve is depicted in FIG. 1, those skilled in the art will appreciate that the concepts of the present invention are applicable to any type rotary valve, including a ball valve or a plug valve.

The seal assembly housing 14 comprises a base plate 28, a sleeve-shaped member 30, and a top plate 32. Conventional bolts 34 may be used to interconnect the plates 28 and 32 to the sleeve 30. A plurality of lower mounting bolts 36 may be used to mount the assembled housing 14 to the top of the valve body, while similar bolts (not depicted) are used to mount a conventional multi-turn rotary actuator 16 to the top of the housing 14. The rotary actuator 16 may be of the type commercially available from a variety of manufacturers, and optionally may include a hand wheel 17 for manual operation of the valve if power to the actuator is interrupted. It should be appreciated that the top, bottom, upper and lower, as used herein, are employed in a conventional manner to describe valve assembly wherein the actuator is generally mounted above the valve body. The terms should not be construed, however, as limiting the orientation of components, since the assembly as shown in FIG. 1 could be rotated 90° about the axis of the flow line interconnected to the valve body, so that housing 14 is oriented to the right of the valve body 12 and the actuator 16 is to the right of the housing 14. In this case, the housing 14 would still be considered mounted to the "top" of the valve body and the actuator 16 mounted to the "top" of the housing 14.

Those skilled in the art will appreciate from the following discussion that it is assumed that the interior of the housing 14 is in fluid communication with maintaining the interior of the housing 14 sealed from the environment outside the housing while enabling the rotary actuator 16 to operate the valve member in a conventional manner. It should be understood, however, that an initial dynamic seal (not shown) could be provided between the rotary valve stem 24 and the valve body 12, such that the interior of housing 14 was open to process fluid pressure only if this initial seal leaked. The present invention assumes that this initial seal is either not provided, or that this initial dynamic seal may leak so that a hermetic seal provided by the present invention effectively prevents the loss of process fluid from the valve assembly. Conventional static seals may be used to seal the plate 28 to the valve body 12, to seal the sleeve-shaped pressure housing 30 to plate 28, and to seal the top plate 32 to the housing 30. These static seals have well-established sealing characteristics and high reliability which are not obtained by dynamic seals intended to seal between sliding or rotating surfaces. The bellows within the housing 14 subsequently described thus provides a hermetic seal with the top plate 32, so that process fluid cannot escape to the rotary actuator 16 or leak from between the top plate 32 and the mounting plate for the rotary actuator 16 to the environment surrounding the valve.

Figure 2:
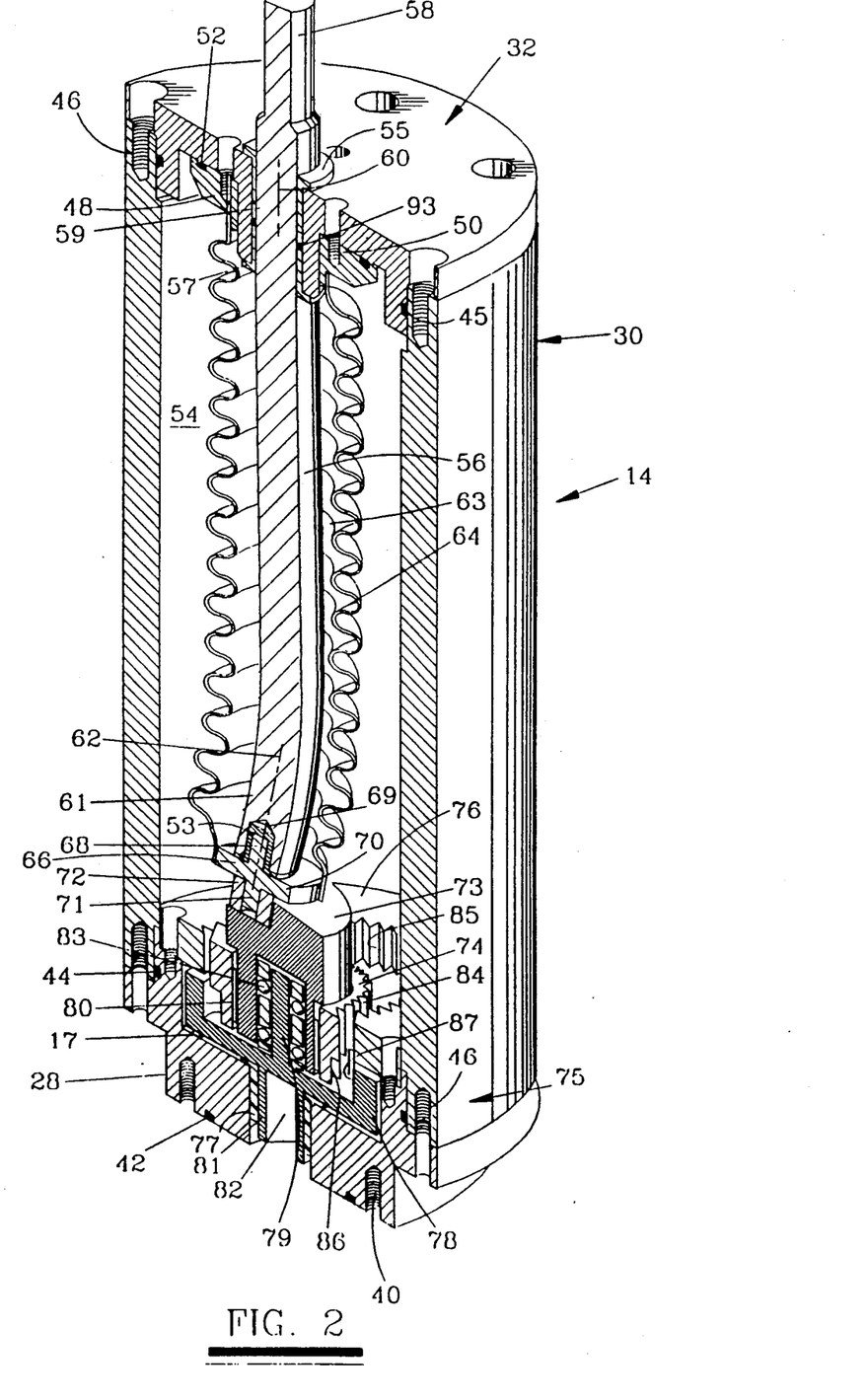
FIG. 2 is a detailed cross-sectional view of the seal assembly housing generally shown in FIG. 1, including a cavity for receiving the upper end of a valve stem, and a shaft protruding from the top of the seal assembly housing for interconnection to a rotary actuator and having an angular offset.

FIG. 2 is a cross-sectional pictorial view of the seal assembly housing 14 generally shown in FIG. 1. The same reference numerals will be used throughout for previously-described components. The base plate 28 includes a plurality of threaded ports 40 for receiving the lower mounting bolts 36, a lower groove for receiving O-ring 42 for static sealing engagement with the valve body, and a similar groove for receiving O-ring 44 for static sealing between the sleeve 30 and the base plate 28. A plurality of threaded ports 46 in the sleeve 30 are provided for receiving bolts 34 to interconnect both the lower base plate 28 and the upper lid 32 to the sleeve 30, while another O-ring 45 provides the static seal between the lid 32 and the sleeve 30. Upper end cap 48 is fixed to lid 32 by bolts (not shown) in threaded engagement with ports 50, while yet another static O-ring 52 seals between the cap 32 and the upper end cap 48. Those skilled in the art will appreciate that the bottom plate 28, the sleeve-shaped member 30, the lid 32 and the upper end cap 48 are provided as separate components for ease in manufacturing and assembly. From a functional viewpoint relating to the operation of the seal assembly housing 14, the end cap 40 may be considered integral with the lid 32, and the lid 32, the base 28 and the sleeve-shaped housing 30 can all be considered part of a unitary housing which defines a cavity 54 in fluid communication with the interior passageway within the valve body.

Bellows 64 is fixedly secured by a weld or other suitable static seal at its upper end to cap 48, and at its lower end is similarly secured to end cap 66. Shaft 56 is rotatively mounted within the cavity 63 formed by the end caps and the bellows, and includes an uppermost portion 58 extending from the lid 32 for interconnection with the rotary output of actuator 16. The upper end 59 of the shaft passes through the cap 48, and rotates about axis 60 which is preferably aligned with the axis 26 of the valve stem 24. The lower end 61 of the shaft includes a lower end axis 62 angled with respect to axis 60, such that a lowermost end of the shaft is offset angularly (or parallel offset as explained subsequently) from the axis 60. Unitary cap 66 has an upper projection 68 which rotates within a cavity 69 provided in the lower end of the shaft 56, an intermediate portion 70 for sealing engagement with the bellows, and a lower projection 71 for fitting within bearing block 72. The lower end cap 66 is thus rotatable with respect to the shaft 56, such that the bearing block 72 moves in a circumferential or orbital path about the axis 60 as the actuator rotates the shaft 56. The end cap 66 and bellows 64 hermetically seal the exterior of the bellows with the end cap 48 and thus seal the interior of the housing which defines the cavity 54 from the environment external of the housing. Fluid pressure within the valve will act on the outside of the bellows, rather than being contained within the interior of the bellows in the fashion as described in U.S. Pat. No. 4,516,754.

Figure 3:
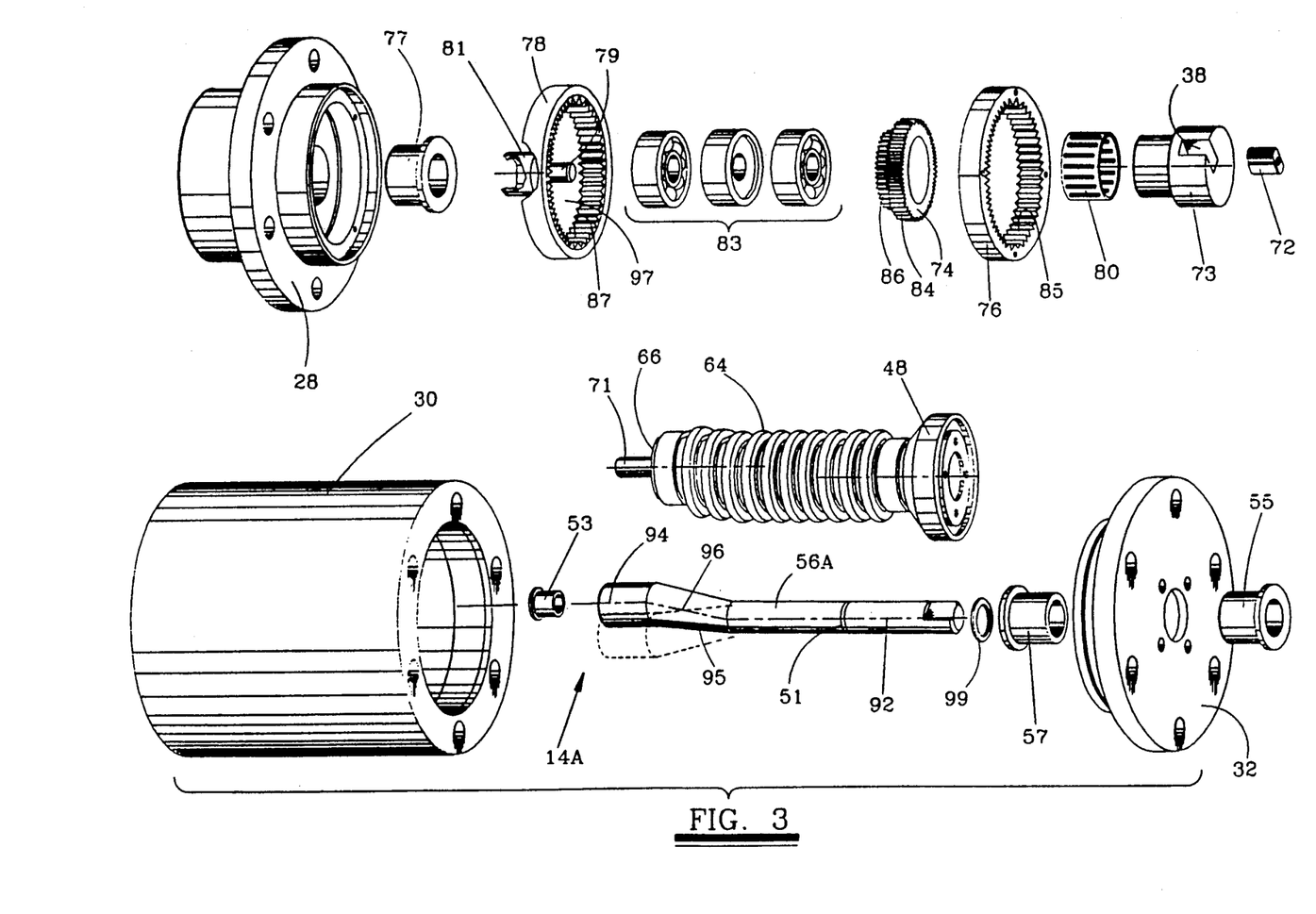
FIG. 3 is an exploded view of an alternate embodiment of a seal assembly housing according to the present invention, illustrating a shaft having a parallel offset rather than an angular offset.

An epicyclic gearing assembly 75 within the cavity 54 comprises an outer gear 76 fixed to the base plate 28 by suitable bolts (not shown), a driven gear 78 rotatable about the axis of the valve stem, and a compound planet gear 74. Driven gear 78 is rotatably mounted to the base plate 28 by bushing 77, and includes both an upper cylindrical member 79 and a lower portion 81 defining port 82 for receiving the upper end of the valve stem. The valve stem and the driven gear 78 are rotatably interconnected, and a conventional flat on the stem and mating projection on the lower portion 81 may be used, as shown in FIG. 3, to allow limited axial movement between the stem and the driven gear while ensuring that the driven gear rotates with the stem. A ball bearing assembly 83 is provided for rotatively mounting eccentric carrier 73 on the upper cylindrical member 79, while a needle bearing assembly 80 enables the compound planet gear 74 to rotate with respect to the eccentric carrier 73. The planet gear 74 has a top set of outer gear teeth 84 for meshing with the inner teeth 85 on the fixed gear 76, and a lower set of outer gear teeth 86 for meshing with the inner teeth 87 on the driven gear 78.

In operation, actuator 16 rotates the shaft 56, thereby driving the bearing block 72, the eccentric carrier 73, and the compound planet gear 74 each in an orbital path about the axis 60, which is aligned with the axis of the valve stem. During this orbital rotation, the teeth 84 mesh with teeth 85, causing the lower teeth 86 on gear 74 to mesh with teeth 87 and rotate the driven gear. Due to the difference in the number of teeth on the gears, the driven gear rotates at a lower rotational velocity than the compound planet gear 74, and the compound planet gear 74 rotates at a lower velocity than the eccentric carrier. This combined substantial reduction in the rotational velocity achieved by the epicyclic gearing is a significant advantage of the present invention. In a typical valve assembly, the gear reduction will be in the range of from 5:1 to 300:1, and preferably from about 25:1 to 100:1. Since the valve member need rotate only one-quarter turn from its fully open position and its fully closed position, an exemplary gear reduction of 40:1 would require that the actuator rotate the shaft 56 ten full revolutions to rotate the valve stem from a fully open position to the fully closed position. This gear reduction results in a significant mechanical advantage to the operator, and because of the epicyclic gearing, an operator with a relatively low torque output will achieve a substantially high torque capability for rotating the valve member. This significant gearing advantage inherently results in the operator being able to closely control or throttle the valve. In the case of the 40:1 gear reduction, a 20° rotation of the shaft by the operator will result in only a 0.5° rotation of the valve stem. This feature also results in the valve being "self-locking" without utilizing an additional stem lock member to prevent "backdrive". In a conventional valve, the fluid force applied to the valve member can cause the actuator to backdrive after the applying force to the actuator is released, and mechanisms are commonly used to achieve self-locking of the valve stem and prevent this backdrive. According to the present invention, the force applied to the valve member is reduced, e.g. by one-fortieth of its original value, before that force is applied to the actuator, thus effectively preventing backdrive.

FIG. 3 depicts an exploded view of another embodiment of a seal assembly 14A, with shaft 56A having a parallel offset arrangement rather than the angular offset for the shaft 56 as shown in FIG. 2. The upper end of the shaft 56A thus rotates about axis 92, while the lower end of the shaft rotates in an orbital manner about axis 92. The centerline 94 of the lower end of the shaft thus remains parallel with and offset from the axis 92, and defines a cylindrical path during operation of the actuator. Intermediate portion 95 of the shaft includes the bend with an inclined axis 96 which results in the offset. The previously-described angular offset is preferred compared to the parallel offset arrangement as shown in FIG. 3 to reduce stress on the bellows, although either embodiment is able to obtain the objects of the present invention. Except as explained below, the seal assembly 14A as shown in FIG. 3 is substantially identical to the previously-described seal assembly, and again like reference numbers are used for identical components.

FIG. 3 illustrates upper and lower bushings 55 and 57 for rotatably guiding the upper end of the shaft with respect to the lid 32. A retaining ring 99 may be fitted into groove 51 on the shaft to prevent the shaft from being pushed out of the housing by the fluid pressure in the cavity 54. The upper end 68 of the end cap 66 (not shown in FIG. 3) is rotatively mounted to the lower end of the shaft 56 through bushing 53. The bearing block 72 may be rotatively mounted to the lower end 71 of the end cap 66, and slid within a groove 38 provided in the eccentric carrier 73. The bellows 64 and end caps 48 and 66 can be functionally identical to those previously described, since the flex in the bellows 64 is able to accommodate the new configuration for the shaft 56A. During assembly, those skilled in the art appreciate that the end caps 48 and 66 are welded or otherwise sealed to the ends of the bellows 64, so that the shaft may be placed within the bellows and the end cap 48 then sealingly secured to the lid 32.

The eccentric carrier 73 and the compound planet gear 74 are slidably rotatable on the planar surface 97 of the driven gear 78. The bearing assembly 83 comprises conventional upper and lower ball bearings and a spacer, each of which are fitted over the upper projection 79 of the driven gear. It is a feature of the present invention that the epicyclic gearing assembly comprises a fixed gear having an axis aligned with the stem axis, a rotatable driven gear having an axis aligned with the stem axis, and a compound planet gear. It is further a feature that the driven gear 78 is rotatively mounted by bushing 77 or a similar device with respect to base plate 28 or other member of the fixed seal assembly housing, that the carrier 73 is rotatably mounted by bearing assembly 83 or a similar device with respect to the driven gear, in that the compound planet gear 74 is rotatably mounted with respect to the carrier by a needle bearing 80 or similar device.

It should now be appreciated that the shaft 56 will typically rotate at least several full revolutions in order to rotate the driven gear and thus the valve stem one-quarter turn. During these revolutions, the lower end cap rotates in a orbital fashion as the bellows flexes, although no substantial torque is imparted to the bellows. The bellows acts as a hermetic seal to effectively seal between the lower end of the shaft and the lid, and accomplishes this objective by sealingly enclosing the bent shaft. Since fluid pressure within the valve acts on the outside of the bellows, squirm problems associated with an internally pressurized bellows are avoided. Using conventional static fields, fluid pressure within the interior 54 of the seal assembly housing is contained, and dynamic seals are avoided.

Another feature of the present invention relates the relatively low angle bend required for the shaft in order to obtain the desired high torque to open and close the valve. In prior art designs, a substantial bend, and in some cases, a fully 90° bend, was utilized to obtain the desire valve operating torque. This significant bend reduced the effective sealing life of the bellows, since the stress on the bellows during operation of the value is directly related to its radius of curvature. According to the present invention, the shaft preferably has a slight bend of 12° or less, thereby resulting in a relatively long effective radius of curvature for the bend in the shaft and the corresponding bend in the bellows. This low angle bend results in a relatively short moment arm for the shaft, but the mechanical advantage obtained by the epicyclic gearing can be easily controlled to multiply this force to obtain almost any desired operating torque for the valve.

The seal assembly housing of the present invention is ideal for use with a conventional rotary actuator having a rotational output which can be coupled directly to the upper end of the shaft. Due to the low torque input required by the operator, a relatively small and inexpensive powered operator may be employed. Alternatively, a conventional hand-operated handle as shown in U.S. Pat. No. 4,462,422 or a hand-operated wheel may be used instead of a powered operator to control opening and closing of the valve. Again, the low torque output requirement of the operator allows manual control of a valve requiring a high torque input, due to the mechanical advantage obtain by the epicyclic gearing. Nevertheless, the design of a seal assembly housing according to the present invention is extremely compact and the gearing does not significantly increase the size requirements of the seal assembly housing. This gearing advantage and compact design in combination with a hermetic seal cannot be obtained with various other types of gearing arrangements, including a worm gear drive.

Various modifications may be made to the embodiments described above. If desired, a conventional dynamic backup seal 93 as shown in FIG. 2 could be provided between the upper end of the shaft and the lid. This seal 93 would minimize or prevent leakage from the seal assembly housing if the primary seal provided by the bellows should catastrophically fail. Also, conventional leak detectors (not shown) that may be employed to monitor leakage from the valve and automatically operate warning devices and/or control operation of the valve or an upstream valve in the system if leakage is detected. As shown in FIG. 2, projections 17 fixed to the driven gear may be provided for engaging stops (not shown) on the base plate 28 to limit rotation or travel of the driven gear, and thus prevent overtorquing of the valve member and ensuring that the valve member does not move past its desired fully opened or fully closed position during operation of the actuator. Bellows 64 may be of a conventional type preferably fabricated from metal, but may also be formed from an elastomeric material. Except for the O-ring seals, the components as shown in FIGS. 2 and 3 may be conventionally fabricated from metal goods.

Further modifications could include the elimination of the eccentric carrier, so that the lower projection of the lower end cap was rotatably connected directly to the compound planet gear. A cavity thus could be provided in the upper face of the compound planet gear to receive this lower projection. The embodiment described herein is preferred, however, since the eccentric carrier is rotatably mounted to the driven gear, and the compound planet gear is rotatably mounted to the carrier, thereby contributing to smooth operation of the gearing, reduced wear, and minimal torque loss. Also, the compound planet gear with its upper and lower sets of teeth could be replaced with upper and lower gears which were either rotatably connected, or were interconnected through one or more additional gears.

Preferred embodiments of the present invention have been illustrated in the foregoing limited to these embodiments. Various other changes and modifications will be apparent to those of ordinary skill in the art, and are considered to be within the scope of the invention. Accordingly, the invention is defined by the scope of the appended claims, and may be practiced other than as specifically explained herein for the described preferred embodiments.

What is claimed is:

1. A rotary valve, comprising:
   a valve body having a passageway extending therethrough for the flow of fluid through the valve;
   a valve member rotatably positioned within the passageway for movement between an open position and a closed position to open and close the valve;
   a valve stem rotatable about a stem axis and interconnected with the valve member for rotating the valve member;
   a seal assembly housing sealingly secured to the valve body and having an interior cavity therein;
   an epicyclic gearing assembly within the cavity and interconnected to the valve stem;
   an eccentric carrier within the cavity and interconnected with the epicyclic gearing assembly;
   a shaft within the cavity having a lower end with an axis offset from the stem axis, and an upper end with an axis offset from the shaft lower end axis;
   an end cap between the shaft and the eccentric carrier rotatable with respect to both the shaft and the carrier;
   a bellows surrounding the shaft and fixedly sealed at its upper end to the seal assembly housing and at its lower end to the end cap to prevent fluid within the cavity from passing out the seal assembly housing and around the upper end of the shaft; and
   an actuator interconnected with the upper end of the shaft for rotating the shaft and thereby the valve stem to open and close the valve.

2. A rotary valve as defined in claim 1, further comprising:
   the valve stem having an upper end extending from the valve body and into the cavity within the seal assembly housing.

3. A rotary valve as defined in claim 1, further comprising:
   the upper end of the shaft extending from the seal assembly housing; and
   the shaft upper end axis is concentric with the valve stem axis.

4. A rotary valve as defined in claim 1, wherein the epicyclic gearing assembly comprises:
   a fixed gear stationary with respect to the seal assembly housing;
   a driven gear rotatable with the valve stem; and
   a compound planet gear having a first set of teeth for engagement with the stationary gear and a second set of teeth for engagement with the driven gear, such that rotation of the compound planet gear with respect to the fixed gear rotates the driven gear.

5. A rotary valve as defined in claim 4, wherein:
   the eccentric carrier is rotatable with respect to the compound planet gear; and
   the fixed gear and the driven gear each have a central axis with the valve stem axis.

6. A rotary valve as defined in claim 1, further comprising:
   the upper end of the shaft extending through the seal assembly housing; and
   a backup seal acting between the seal assembly housing and the upper end of the shaft for minimizing the escape of fluid from the seal assembly housing if the bellows should catastrophically leak.

7. A rotary valve as defined in claim 4, further comprising:
   a first bearing for rotatably mounting the driven gear to the seal assembly housing;
   a second bearing for rotatably mounting the eccentric carrier to the driven gear; and
   a third bearing for rotatably mounting the compound planet gear to the eccentric carrier.

8. A rotary valve as defined in claim 1, wherein the shaft has a bend of less than 12° to offset the shaft lower end axis from the shaft upper end axis.

9. A rotary valve, comprising:
   a valve body having a passageway extending therethrough for the flow of fluid through the valve;
   a valve member rotatably positioned within the passageway for movement between an open position and a closed position;
   a valve stem rotatable about a stem axis and interconnected with the valve member for rotating the valve member;
   a seal assembly housing sealingly secured to the valve body and having an interior cavity therein;
   a gearing assembly interconnected to the valve stem;
   a shaft within the cavity having a lower end with an axis spaced from the stem axis, and an upper end with an axis spaced from the shaft lower end axis;
   an end cap between the shaft and the gearing assembly rotatable with respect to both the shaft and the gearing assembly such that the gearing assembly operationally connects the lower end of the shaft with the valve stem; and
   a bellows surrounding the shaft and sealed at its upper end to the seal assembly housing and at its lower end to the end cap to prevent fluid within the cavity from passing out the seal assembly housing and around the upper end of the shaft.

10. A rotary valve as defined in claim 9, further comprising:
an actuator interconnected with the upper end of the shaft for rotating the shaft and the valve stem to open and close the valve.

11. A rotary valve as defined in claim 9, further comprising:
the valve stem having an upper end extending from the valve body and into the cavity within the seal assembly housing.

12. A rotary valve as defined in claim 9, wherein the gearing assembly comprises:
an outer gear stationary with respect to the seal assembly housing;
a driven gear rotatable with the valve stem; and
a compound planet gear having a first set of teeth for engagement with the stationary gear and a second set of teeth for engagement with the driven gear, such that rotation of the compound planet gear with respect to the fixed gear rotates the driven gear.

13. A rotary valve as defined in claim 12, further comprising:
an eccentric carrier rotatably interconnected with the compound planet gear; and
the fixed gear and the driven gear each have a central axis aligned with the valve stem axis.

14. A rotary valve as defined in claim 9, further comprising:
the upper end of the shaft extending through the seal assembly housing and concentric with the valve stem axis; and
a backup seal acting between the seal assembly housing and the upper end of the shaft for minimizing the escape of fluid from the seal assembly housing if the bellows should catastrophically leak.

15. A rotary valve as defined in claim 9, wherein the shaft has a bend of less than 12° to offset the shaft lower end axis from the shaft upper end axis.

16. An activating device for rotating a member mounted within an enclosure while sealing the enclosure from the environment, the member being interconnected to a stem extending from the enclosure and rotatable about a stem axis aligned with an activating device output axis, the activating device, comprising:
a seal assembly housing sealingly secured to the enclosure and having an interior cavity therein;
a fixed gear stationary with respect to the seal assembly housing;
a driven gear rotatable about the activating device output axis and adapted for rotatable interconnection to the stem;
a compound planet gear having a first set of teeth for engagement with the stationary gear and a second set of teeth for engagement with the driven gear, such that rotation of the compound planet gear with respect to the fixed gear rotates the driven gear;
an eccentric carrier within the cavity and interconnected with the compound planet gear;
a shaft within the cavity having a lower end with an axis spaced from the activating device output axis, and an upper end with an axis spaced from the shaft lower end axis;
an end cap between the shaft and the eccentric carrier rotatable with respect to both the shaft and the carrier; and
a bellows surrounding the shaft and sealed at its upper end to the seal assembly housing and at its lower end to the end cap to prevent fluid within the cavity from passing out the seal assembly housing and around the upper end of the shaft.

17. An activating device as defined in claim 16, further comprising:
an actuator interconnected with the upper end of the shaft for rotating the shaft to rotate the member within the enclosure; and
the shaft upper end axis is concentric with an output axis of the actuator.

18. An activating device as defined in claim 16, further comprising:
the upper end of the shaft extending through the seal assembly housing; and
a backup seal acting between the seal assembly housing and the upper end of the shaft for minimizing the escape of fluid from the seal assembly housing if the bellows should catastrophically leak.

19. An actuating device as defined in claim 16, further comprising:
a first bearing for rotatably mounting the driven gear to the seal assembly housing;
a second bearing for rotatably mounting the eccentric carrier to the driven gear; and
a third bearing for rotatably mounting the compound planet gear to the eccentric carrier.

20. An actuating device as defined in claim 16, wherein the shaft has a bend of less than 12° to offset the shaft lower end axis from the shaft upper end axis.

* * * * *

UNITED STATES PATENT AND TRADEMARK OFFICE
CERTIFICATE OF CORRECTION

PATENT NO. : 5,090,658
DATED : February 25, 1992
INVENTOR(S) : Dan P. Kusmer It is certified that error appears in the above-identified patent and that said Letters Patent is hereby corrected as shown below:

In Column 10, line 26, after the first word "axis" insert the word

--aligned--.

Signed and Sealed this

Eleventh Day of May, 1993

Attest:

MICHAEL K. KIRK

Attesting Officer

Acting Commissioner of Patents and Trademarks